(12) United States Patent
Hamilton et al.

(10) Patent No.: US 9,367,257 B2
(45) Date of Patent: Jun. 14, 2016

(54) TECHNIQUES FOR RESOURCE LOCATION AND MIGRATION ACROSS DATA CENTERS

(75) Inventors: James R Hamilton, Bellevue, WA (US); Michael J Manos, North Bend, WA (US); John D Dunagan, Bellevue, WA (US); Alastair Wolman, Seattle, WA (US); Sharad Agarwal, Seattle, WA (US); Ming Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 828 days.

(21) Appl. No.: 12/209,008

(22) Filed: Sep. 11, 2008

(65) Prior Publication Data

US 2010/0076933 A1 Mar. 25, 2010

(51) Int. Cl.
*G06F 17/30* (2006.01)
*G06F 3/06* (2006.01)

(52) U.S. Cl.
CPC ............ *G06F 3/0647* (2013.01); *G06F 3/0604* (2013.01); *G06F 3/067* (2013.01)

(58) Field of Classification Search
CPC .......................... G06F 3/0647; G06F 17/30082
USPC ......................................................... 707/610
See application file for complete search history.

(56) References Cited

U.S. PATENT DOCUMENTS

| | | | |
|---|---|---|---|
| 6,230,200 B1 | 5/2001 | Forecast et al. | |
| 6,381,619 B1 * | 4/2002 | Borowsky et al. | ............ 711/170 |
| 6,430,607 B1 | 8/2002 | Kavner | |

(Continued)

FOREIGN PATENT DOCUMENTS

| | | |
|---|---|---|
| JP | 2005031834 | 2/2005 |
| WO | WO2010/030489 A2 | 3/2010 |

OTHER PUBLICATIONS

Dan, et al., "Connecting Client Objectives with Resource Capabilities: An Essential Component for Grid Service Management Infrastructures", at <<http://delivery.acm.org/10.1145/1040000/1035177/p57-dan.pdf?key1=1035177&key2=3080453811&coll=GUIDE&dl=GUIDE&CFID=23025626&CFTOKEN=97234671>>, ACM, 2004, pp. 57-64.

(Continued)

*Primary Examiner* — Syed Hasan
(74) *Attorney, Agent, or Firm* — Steve Wight; Sandy Swain; Micky Minhas (57) ABSTRACT

An exemplary system includes a front-end component to receive requests for resources in a data center and configured to associate each request with identifying information, to locate one or more resources for each request and to store, in a log file, the identifying information and information about the location of the one or more resources; one or more distributed computation and storage components to acquire log file information and configured to analyze log information to decide if one or more resources associated with one or more requests should be migrated to a data center in a different geographical location; and a location service component to receive decisions made by the one or more distributed computation and storage components and configured to inform the front-end component when a decision causes one or more resources to be migrated to a data center in a different geographical location to thereby allow the front-end component to re-direct future requests for the one or more migrated resources to the data center in the different geographical location. Various other devices, systems and methods are also described.

20 Claims, 9 Drawing Sheets

(56) References Cited

U.S. PATENT DOCUMENTS

| | | | |
|---|---|---|---|
| 6,571,286 | B2 | 5/2003 | Fisher et al. |
| 6,973,500 | B1 | 12/2005 | Yamamoto et al. |
| 7,082,521 | B1 | 7/2006 | Nanja |
| 7,827,286 | B1* | 11/2010 | Deflaux et al. ............... 709/226 |
| 2001/0047406 | A1 | 11/2001 | Araujo et al. |
| 2002/0055972 | A1 | 5/2002 | Weinman, Jr. |
| 2003/0046357 | A1 | 3/2003 | Doyle et al. |
| 2003/0220998 | A1 | 11/2003 | Jennings, III et al. |
| 2003/0229697 | A1 | 12/2003 | Borella |
| 2004/0073639 | A1 | 4/2004 | Basoglu et al. |
| 2004/0243691 | A1* | 12/2004 | Viavant et al. ............... 709/220 |
| 2005/0010734 | A1* | 1/2005 | Soejima et al. .............. 711/163 |
| 2005/0125456 | A1 | 6/2005 | Hara et al. |
| 2006/0036743 | A1 | 2/2006 | Deng et al. |
| 2006/0271700 | A1 | 11/2006 | Kawai et al. |
| 2007/0021998 | A1 | 1/2007 | Laithwaite et al. |
| 2007/0174660 | A1* | 7/2007 | Peddada ........................... 714/4 |
| 2008/0155537 | A1 | 6/2008 | Dinda et al. |
| 2009/0055507 | A1* | 2/2009 | Oeda ............... 709/216 |
| 2009/0144393 | A1* | 6/2009 | Kudo ............... 709/218 |
| 2009/0288150 | A1* | 11/2009 | Toomim et al. .................. 726/5 |

OTHER PUBLICATIONS

Doyle, et al, "Model-Based Resource Provisioning in a Web Service Utility", available at least as early as Jul. 4, 2007, at <<http://www.cs.ucsd.edu/~vahdat/papers/mbrp-usits03.pdf>>, pp. 14.

Fong, et al., "Dynamic Resource Management in an eUtility", available at least as early as Jul. 4, 2007, at <<http://orion.lrg.ufsc.br/ine5619022/artigos_sla/s16p3_kalantarCD.pdf.pdf>>, pp. 14.

Chinese Office Action mailed Jan. 30, 2013 for Chinese patent application No. 200980135951.7, a counterpart foreign application of U.S. Appl. No. 12/209,008, 6 pages.

Chinese Office Action mailed Sep. 13, 2012 for Chinese patent application No. 200980135951.7, a counterpart foreign application of U.S. Appl. No. 12/209,008, 13 pages.

Extended European Search Report mailed Sep. 21, 2012 for European patent application No. 09813436.4, 9 pages.

Zhu et al., "1000 Islands: Integrated Capacity and Workload Management for the Next Generation Data Center," IEEE International Conference on Autonomic Computing, Jun. 2, 2008, pp. 172-181.

European Office Action mailed May 28, 2015 for European patent application No. 09813436.4, a counterpart foreign application of U.S. Appl. No. 12/209,008, 7 pages.

European Office Action mailed Dec. 14, 2015 for European patent application No. 09813436.4, a counterpart foreign application of U.S. Appl. No. 12/209,008, 6 pages.

"Office Action Received for Korean Patent Application No. 10-2011-7005531", Mailed Date: Sep. 15, 2015, 9 Pages.

* cited by examiner

EXEMPLARY SCENARIO 600

LOG DATA USER A
LOG DATA USER B
LOG DATA OTHER USERS

GEOGRAPHIC INFO
LOAD INFO
OTHER INFO

TECHNIQUES FOR RESOURCE LOCATION AND MIGRATION ACROSS DATA CENTERS

BACKGROUND

Large scale data centers are a relatively new human artifact, and their organization and structure has evolved rapidly as the commercial opportunities they provide has expanded. Typical modern data centers are organized collections of clusters of hardware running collections of standard software packages, such as web servers, database servers, etc., interconnected by high speed networking, routers, and firewalls. A typical data centers operates in response to requests where requests are routed to resources such as files, modules, etc., in the data center. Some of these resources may be migratable, i.e., they may be migrated via a network from one data center to another.

Web services (e.g., software as a service "SaaS") supported by data centers are also rapidly evolving (for example, a company might first offer a search service, and then an email service, and then a Map service, etc.). When a service reaches a certain size, a decision is often made to geo-host the service, i.e., to host the service at multiple, geographically disparate data centers. Further, as new data centers come on-line, a service operator may decide to expand its services to one or more new data centers, while maintaining or abandoning hosting of the service at other data centers. Competition as to cost and performance (i.e., value) can also be a factor in locating a service and associated resources. Given this environment, large, geo-hosted services tend to exist in sub-optimal states where many users and the resources they request have no or little geographical correspondence. For example, a user in San Francisco, Calif. may have a mailbox for her email service hosted in Blue Ridge, Va. When such a scenario is placed into context, one may conclude that hundreds of thousands of users may be geographically remote from their resources, which can greatly diminish user experience and increase a service's operational costs.

Various exemplary technologies described herein pertain to techniques that can decide whether to migrate resources from one data center to another data center, which, in turn, may enhance user experience and performance of the "cloud" (e.g., the Internet and associated data centers).

SUMMARY

An exemplary system includes a front-end component to receive requests for resources in a data center and configured to associate each request with a unique request information, to locate one or more resources for each request and to store, in a log file, the request information and information about the location of the one or more resources; one or more distributed computation and storage components to acquire log file information and configured to analyze log information to decide if one or more resources associated with one or more requests should be migrated to a data center in a different geographical location; and a location service component to receive decisions made by the one or more distributed computation and storage components and configured to inform the front-end component when a decision causes one or more resources to be migrated to a data center in a different geographical location to thereby allow the front-end component to re-direct future requests for the one or more migrated resources to the data center in the different geographical location. Various other devices, systems and methods are also described.

DESCRIPTION OF DRAWINGS

Non-limiting and non-exhaustive examples are described with reference to the following figures.

DETAILED DESCRIPTION

Various exemplary methods, devices, systems, etc., described herein pertain to locating and migrating remote user data across geographically disparate data stores based on log information generated in response to user requests for such data. Migration of remote user data from one data store to another data store, in another geographic location, can increase performance and availability. Such migrating can decrease access time and enhance user experience.

Figure 1:
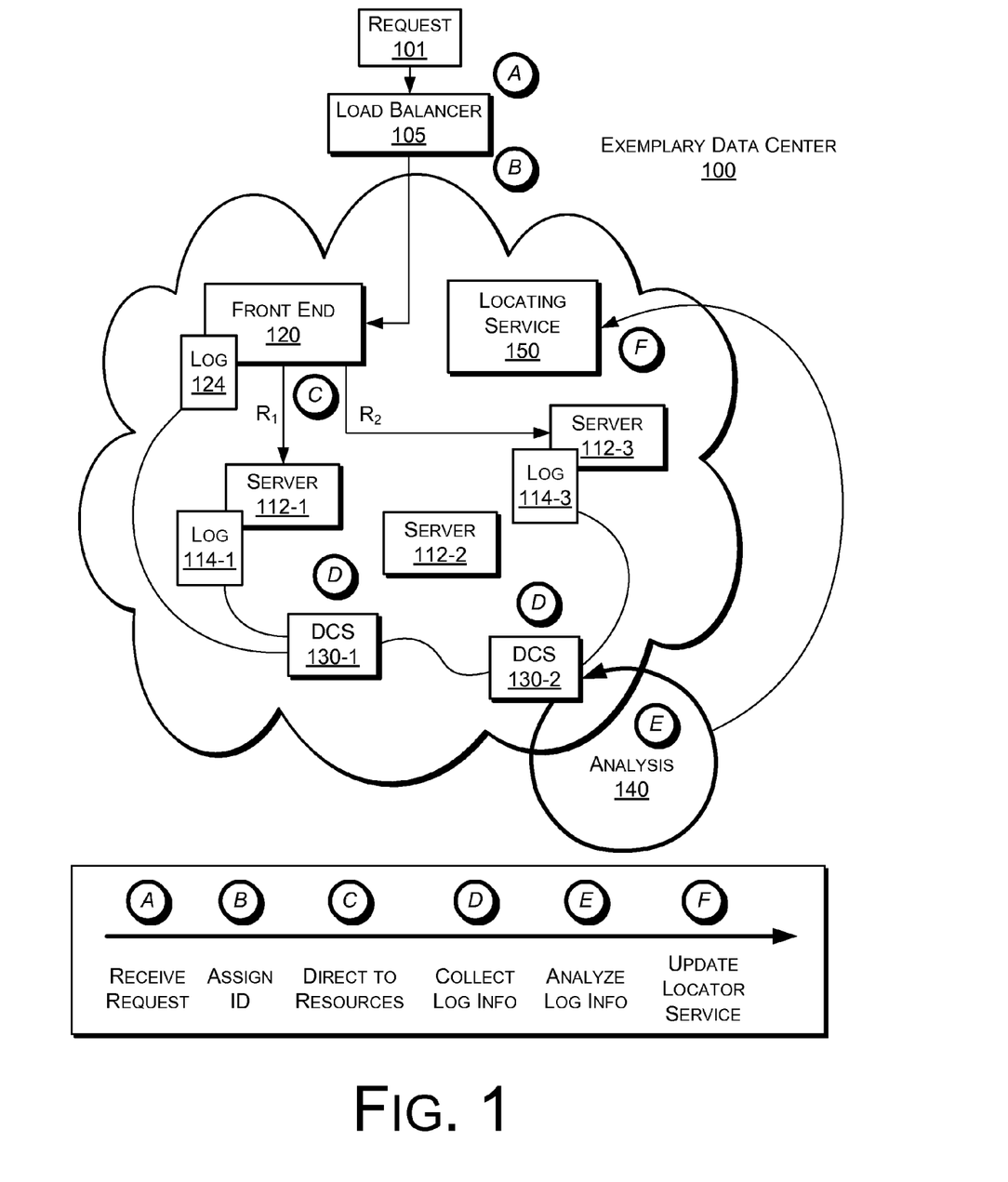
FIG. 1 is a block diagram of an exemplary data center that can decide whether one or more migratable resources should be migrated to another data center.

FIG. 1 shows a logical view of an exemplary data center 100 with a server cluster (e.g., servers 112-1, 112-2 and 112-3) exposed to a public interface at a load balancer component 105. As described herein, the system 100 includes various components that allow for locating and migrating data to another data center at a different geographical location. Various exemplary techniques recognize that a relationship exists between geography and latency where the greater the geographic distance between a requestor of a resource and the resource, the greater the latency (e.g., due to length of network cables, number of router hops, etc.). However, various exemplary techniques can also recognize that other factors may be taken into account when deciding whether to migrate a resource. For example, if a data center is close, yet traffic congested (e.g., due to number of users and bandwidth limits), then geographic proximity may not provide the smallest latency.

In the data center 100, the load balancer component 105 and a front-end component 120 allow for external access to servers 112-1, 112-2 and 112-3, which may be accessed by application servers or users that are submitting requests or retrieving request results from the data center 100. For example, consider the request 101 as being generated by a user accessing an email folder stored in the data center 100 or a user retrieving results from an earlier submitted batch job to the data center 100. While the load balancer 105 and front-end component 120 are shown as separate components, these may be aggregated at one or more machines (e.g., computers, network devices, etc.). Further, while the example of FIG. 1 shows three servers, in practice the number of servers in a data center is typically orders of magnitude greater; hence, the data center 100 may have 100 servers or more.

In the data center 100, so-called "middleware" may be installed on the load balancer component 105 and/or the front-end component 120 to provide tools for resource management, job scheduling, and node state monitoring, etc. Further, each server 112-1, 112-2 and 112-3 in the cluster can access information stored in associated data center storage devices (e.g., under a common file system) and can operate on incoming and/or retrieved information (e.g., number crunching, rendering, compiling, file manipulation, etc.). In the example of FIG. 1, while data stores are not shown, each of the servers 112-1, 112-2 and 112-3 is configured to access data stores (e.g., via a data center network infrastructure).

Referring to the timeline and associated arrows of FIG. 1, the load balancer component 105 can receive a request 101 ("A") and assign a request ID to the request 101 ("B"). The request 101 further includes source information such as an IP address that can be used to identify the source of the request 101. The load balancer component 105 then sends the request 101 with its request ID and source information to a front-end component 120. The front-end component 120 includes information about the location of resources (e.g., computing resources, data, etc.) in the data center 100 and can direct the request 101 to such resources ("C"). For example, as shown, the request 101 is broken into sub-requests R1 and R2 where R1 is directed to the server 112-1 and the request R2 is directed to the server 112-3. The front-end component 120 stores this direction information in a log 124, along with the request ID and the source information. Further, the server 112-1 has an associated log 114-1 and the server 112-3 has an associated log 114-3. The logs 114-1 and 114-3 store information about the sub-requests R1 and R2, respectively, along with at least the request ID. Hence, in the system 100, the request ID for the request 101 can be used to identify all log information associated with the request 101.

The system 100 includes one or more distributed computation storage (DCS) components 130-1 and 130-2. In the example of FIG. 1, the DCS components 130-1 and 130-2 can communicate with each other, as indicated by a connecting line, as well as with various logs (e.g., 124, 114-1 and 114-2). Hence, the DCS components 130-1 and 130-2 can collect log information ("D") about requests, such as the request 101.

A looped arrow associated with an analysis process 140, analyzes the collected log information ("E"). The analysis 140 may rely on a model, an optimization technique and one or more other types of information to make decisions as to location and migration of resources in the data center 100. The analysis 140 may be performed in a distributed manner by the DCS components, which ultimately generate a decision that can be communicated to a locating service component 150, for example, to update the locating service 150 ("F") with new optimized location information for resources associated with the request 101 (or other requests). In turn, the locating service 150 can optionally call for migration of resources in the data center to another data center. Depending on acceptance of such a migration call by the other data center, the locating service 150 may then perform a migration process that migrates one or more pieces of data, objects, code, etc., to the other data center. As mentioned, such a process can help to increase data center performance and decrease access time to the migrated resource and enhance experience for one or more users that make requests that involve the migrated resource or resources.

Migration or location decisions may consider any of a variety of factors. For example, factors such as latency between user and one or more data centers, available capacity in one or more data centers (e.g., available CPUs, available memory, available disk storage space, available bandwidth within a data center network, available bandwidth between a data center and one or more external locations), state that is shared across multiple entities external to a data center (e.g., data center housed applications) business factors, legal constraints (e.g., Canadian banking data must be stored in Canada), etc. Also, a migration decision for a hard state may be different than for a soft state. For example, with a hard state, only a most frequently used portion of the hard state may be migrated, or it may be replicated instead of moved, or just the primary replica may be moved. Hence, decisions as to when and where to migrate a piece of state between data centers can depend on multiple factors. In general, a decision can depend on factors that may be flexible and testable to achieve efficiencies (e.g., better configurations) while complying with inflexible and untestable constraints that should not be violated.

As explained in more detail below with respect to FIGS. 3 and 5, a data center, with respect to migratable resources, may be considered as being in a "configuration" (e.g., a pre-migration configuration) where one or more migrations (e.g., in and/or out) causes the data center to attain a different configuration (e.g., a post-migration configuration).

As described herein, an exemplary system can include a front-end component (e.g., front-end component 120) to receive requests for resources in a data center and configured to associate each request with identifying information, to locate one or more resources for each request and to store, in a log file, the identifying information and information about the location of the one or more resources; one or more distributed computation storage components (e.g., DCS components 130-1, 130-2) to acquire log file information and configured to analyze log information to decide if one or more resources associated with one or more requests should be migrated to a data center in a different geographical location; and a locating service component (e.g., locating service component 150) to receive decisions made by the one or more distributed computation storage components and configured to inform the front-end component when a decision causes one or more resources to be migrated to a data center in a different geographical location to thereby allow the front-end component to re-direct future requests for the one or more migrated resources to the data center in the different geographical location.

As described herein, in such a system, one or more resources are migratable resources, capable of being migrated via a network (e.g., the Internet or other network or networks) from one data center to another data center. In such a system, the log information may include an IP address that geographically locates an issuer of a request and/or IP addresses that geographically locate issuers of requests for at least one common resource. Depending on the type of resource and manner of requesting (e.g., identification process, authentication process, etc.), other types of information may be available to geographically locate an issuer of a request. As described in more detail below, the one or more distributed computation and storage components may analyze log information with respect to a model that allows for migration decisions that help to avoid local minima configurations (e.g., to seek a global minimum). While various examples describe particular types of log information, a migration decision may be based, wholly or in part, on any of a variety of information (e.g., frequency of user requests, server availability, server capacity, network path quality, application performance requirements, etc.).

As mentioned, a decision process can rely on any of a variety of information. In various examples, such information may be acquired from a log file or log files (e.g., log information). More generally, a decision process may rely on communications where a communication by itself is information or where a communication includes information. Communications may be indirect, direct or other types of communications related to or relevant to a configuration and whether a better configuration may be possible by migrating one or more resources. For example, a decision process may rely on direct, real-time communication with a component of an optimization system. Whether a communication merely acts as a signal or actually provides an information "payload" can depend on specifics of an optimization algorithm, particularly goals to be achieved (e.g., optimize data center, optimize user experience, optimize current workload issues, optimize future workload issues, etc.).

With respect to identifying information, the example of FIG. 1 mentions a "request ID", which may be assigned by a component of a data center. However, as described herein, alternatively or additionally, one or more other types of information may be used. For example, a timestamp and IP address of a requester may be sufficient for purposes of optimizing a data center configuration or data center configurations. In general, any of a variety of pieces of information may be associated to sufficiently identify a request for purposes of data collection and analysis. Various exemplary techniques described herein can rely on unique identifiers for requests (e.g., unique request IDs) and/or rely on information sufficient to identify a request for purposes of deciding whether to migrate a resource. More general scenarios also exist where patterns of data access from different geographic locations may be collected and analyzed to decide whether to migrate one or more resources from one data center to another (or others). As described below, resource migration changes the configuration of one or more data centers. In some instances, geo-hosting of a resource may be optimal whereas in other instances hosting by a single data center in a particular location may be optimal.

Figure 2:
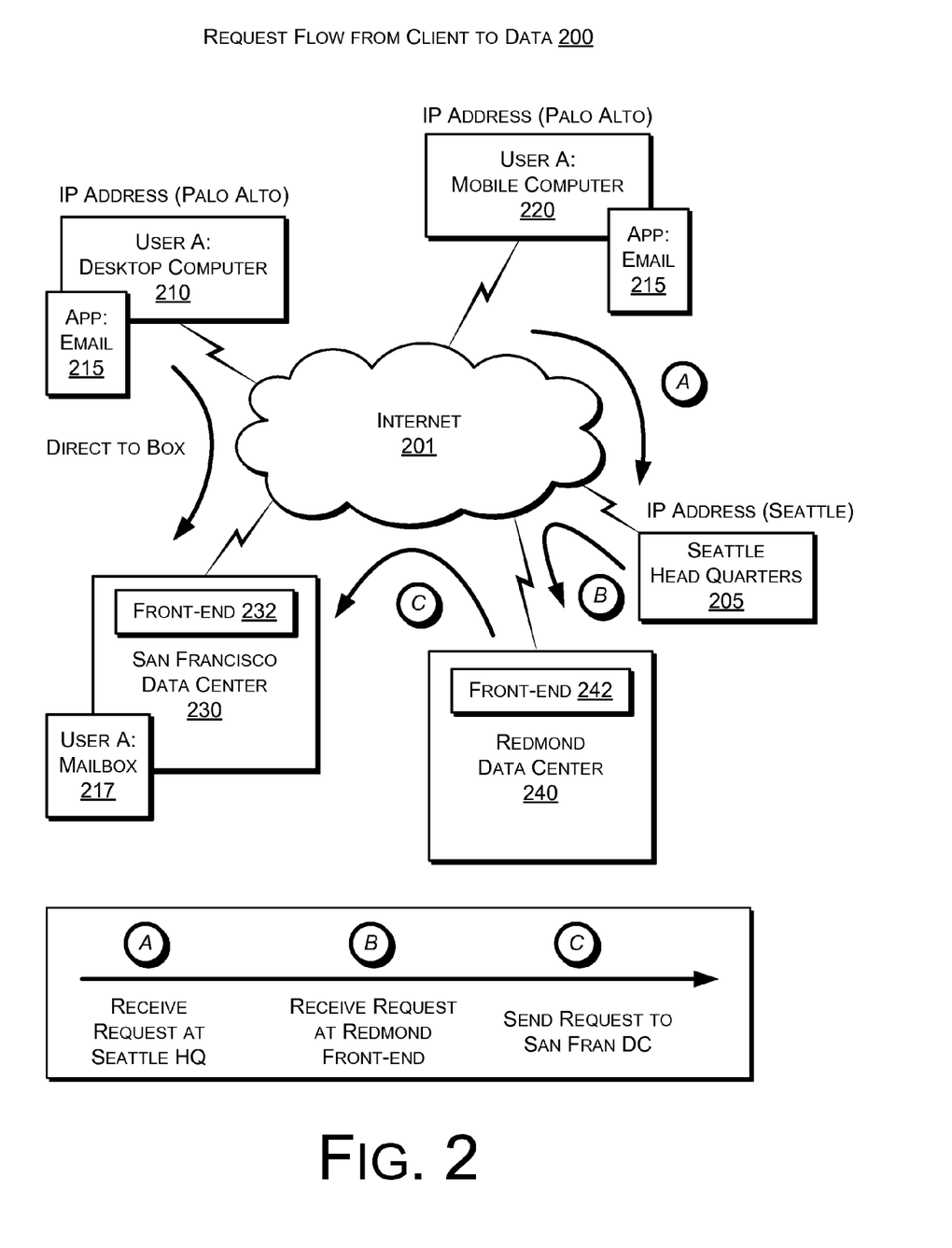
FIG. 2 is a block diagram of request flow from a client to data in a data center where the request flow differs based on aspects of the client device issuing the request.

FIG. 2 shows a diagram of a request flow from a client to target data 200. In this example, a user A has a desktop computer 210 and a mobile computer 220 where both computers 210 and 220 execute an email application 215. The email application 215 may be considered a service where email is stored in a data center remote from the user computers 210 and 220. As shown, in the current state, the mailbox 217 for user A is stored in a data center 230 located in San Francisco. As user A lives in a neighboring community, Palo Alto, when user A requests email located in the mailbox 217, a request is routed via the Internet to the San Francisco data center 230. An exemplary system may assume that the close proximity of user A's desktop computer 210 and associated IP address to the San Francisco data center 230 provides user A with a good user experience (i.e., little latency between request for email and receipt of email by the application 215 of the desktop computer 210).

In the example of FIG. 2, however, a sub-optimal situation (e.g., configuration) arises for user A when she accesses her mailbox using her mobile computer 220. For example, due to company policy, a VPN network is established that routes all requests for email via a corporate headquarters 205, which is located in Seattle ("A"). In turn, a system at the Seattle HQ 205 routes the request to a near-by data center in Redmond 240 ("B"). This approach makes sense because the people located at the Seattle HQ 205 want low-latency access to email. However, when user A's request arrives at a front-end component 242 of the Redmond data center 240, it determines that the requested resource (i.e., user A's mailbox 217) is located in the San Francisco data center 230. Consequently, the Redmond data center 240 is burdened with this determination and the task of sending the request to the San Francisco data center 230 ("C"). If during some period of time user A predominantly accesses her mailbox using her mobile computer, the performance of accessing her mailbox using her mobile computer may be deemed more important than accessing her mailbox using her desktop computer.

Figure 3:
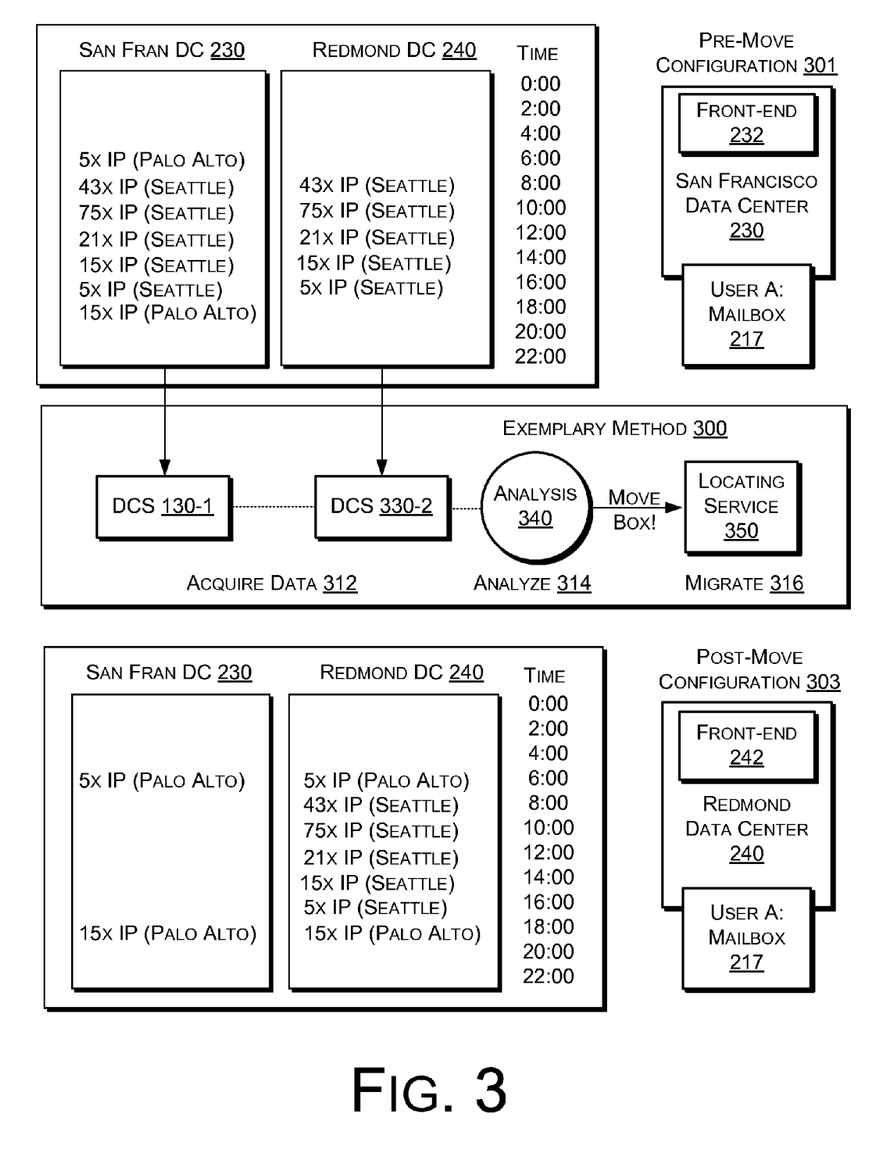
FIG. 3 is a block diagram of an exemplary method for deciding whether to migrate a resource (e.g., a mailbox) of the user of FIG. 2 to a different data center.

FIG. 3 shows an exemplary method 300 and information (e.g., generated log information, signaled information or other acquired information) associated with the San Francisco data center and Redmond data center configuration of FIG. 2. As shown, information at the San Francisco data center 230 and the Redmond data center 240 include time of day, number of requests, and IP address of each request for a pre-move configuration 301 where user A's mailbox 217 is located in the San Francisco data center 230. Such information may be typical log information generated by the data centers in response to requests. As described herein, a log may include any of a variety of information (e.g., request ID, size of data, size of object, time of request, latency between sending time and receiving time of a request, originating IP address, intermediate IP address(es), application/service type, etc.). In general, a log may include information generated at a data center, signaled to a data center or otherwise acquired by a data center. A log may be a conventional data center log or a customized log that includes information that can assist in a decision analysis.

According to the method 300, in an acquisition phase 312, a DCS component 330-1 acquires information from the San Francisco data center 230 and a DCS component 330-2 acquires information from the Redmond data center 240. In this example, and other examples, acquisition may be via a push model where log files are pushed to one or more DCS components (e.g., periodically, in response to an event, upon filling a buffer, etc.). The DCS components 330-1 and 330-2 coordinate action and in an analysis phase 314 analyze the acquired information according to an analysis module 340. As indicated, the analysis phase 314 makes a decision to move the mailbox 217 from the San Francisco data center to the Redmond data center 240. In a migration phase 316, a locating service 350 migrates the mailbox 217 according to the decision of the analysis phase 314 to generate a post-move configuration 303.

After migration, the overall burden on the San Francisco data center 230 is reduced. Further, user A should experience a decrease in latency when accessing her mailbox 217 from her mobile computer 220. In other words, the post-move configuration 303 is more optimal than the pre-move configuration for goals of reducing load at data center 230 and/or enhancing user experience for the user A, when accessing her mailbox 217 from her mobile computer 220.

In the example of FIGS. 2 and 3, the analysis module 340 may make a migration decision based on any of a variety of factors such as IP address of request, multiple burdens (i.e., a single request burdens two data centers), time of day of a request, number of requests, etc. In this example, any of these factors alone may lead to a decision to migrate user A's mailbox 217. When such factors are combined, then the confidence of moving to a more efficient configuration increases. As described herein, migration decisions may rely on multiple factors to increase decision confidence or, in other words, the probability that a migration decision will lead to a more optimal configuration.

While the example of FIGS. 2 and 3 mention number of times a resource is requested and a location associated with each request, other information may be available to make decisions. For example, data centers that host applications that allow for advertising often expose a variety of statistics to help the advertisers target advertisements. Such statistics, sometimes referred to as targets, can include age, agent, client, connection speed, gender, occupation, state/province, time zone, country, region, and user language.

A particular data center hosted email service known as HOTMAIL® (Microsoft Corporation, Redmond, Wa.), provides email services for users in more than 200 countries and territories. The WINDOWS® LIVE® HOTMAIL® service offers consumer and ad features to reach an email audience of over 20 million unique users in the United States (an audience with billions of page views). As described herein, migration and advertising may operate in a synergistic manner, for example, by making decisions on the same underlying information. An exemplary method can make a migration decision and an advertising decision for a migratable resource based on any of a variety of statistics.

Figure 4:
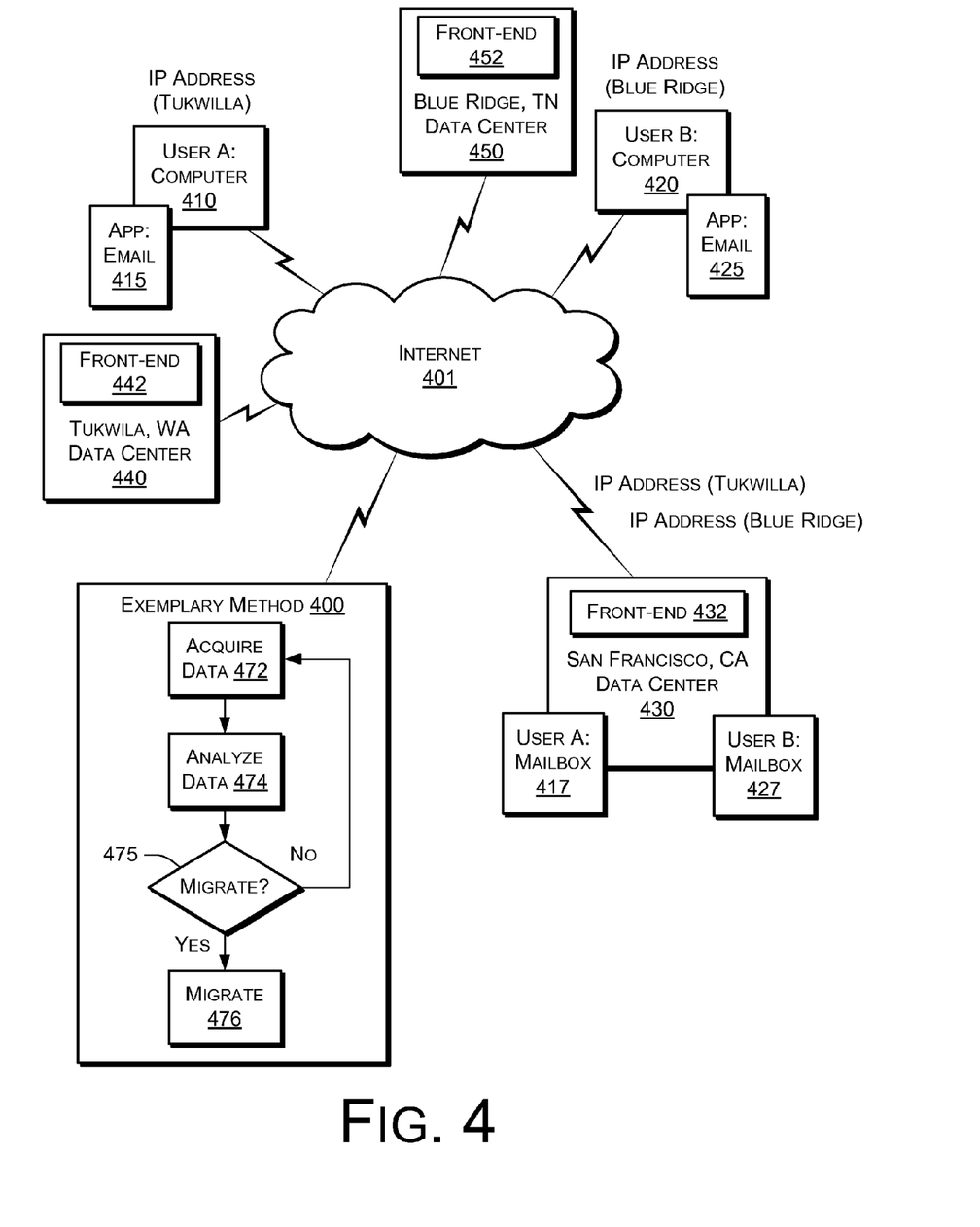
FIG. 4 is a block diagram of an exemplary method that decides whether to migrate resources for multiple users based at least in part on the geographical location (e.g., as approximated by the IP address) of the users.

FIG. 4 shows a scenario where an exemplary method 400 can make multiple migration decisions that cause a data center to migrate data for multiple users. For example, such a method may be applied specifically to a particular distributed service such as an email service where an existing configuration stores user data across multiple, geographically disparate data centers.

The example of FIG. 4 shows an email service with data stored in a San Francisco, Ca. data center 430, a Tukwila, Wa. data center 440 and a Blue Ridge, Va. data center 450. A user A has a computer 410 with an email application 415 that sends requests from a Tukwila IP address and a user B has a computer 420 with an email application 425 that sends requests from a Blue Ridge IP address. For any of a variety of reasons, the current state locates a mailbox 417 for user A and a mailbox 427 for user B at the San Francisco data center 430. Such a situation may be due to prior residences of user A and user B (e.g., signed up for email service while in college in San Francisco).

According to the method 400, an acquisition block 472 acquires data (e.g., information) associated with requests from user A and user B for mailboxes 417 and 427, respectively. An analysis block 474 analyzes the acquired data. A decision block 475 decides whether migration should occur for one or both mailboxes. The analysis block 474 may consider factors associated with user A and user B mailboxes 417 and 427. For example, if the email accounts pertain to employee accounts of a corporate employer and a certain percentage (number, size, etc.) of email originates from a corporate campus, having a large number of employees (e.g., corporate headquarters), then the analysis block 474 may consider this fact and decide not to migrate such mailboxes. In another example, regardless of employer or association, if user A and user B have a certain percentage of cross-mail (e.g., mailing each other), then an algorithm may rely on this fact in deciding not to migrate both mailboxes 417 and 427.

As shown, if the decision block 475 decides to migrate one or both boxes, then the method 400 enters a migration block 476 that calls for mailbox migration. Actual migration may occur automatically or may require oversight or acceptance by a manager (e.g., a data center manager or managers).

Figure 5:
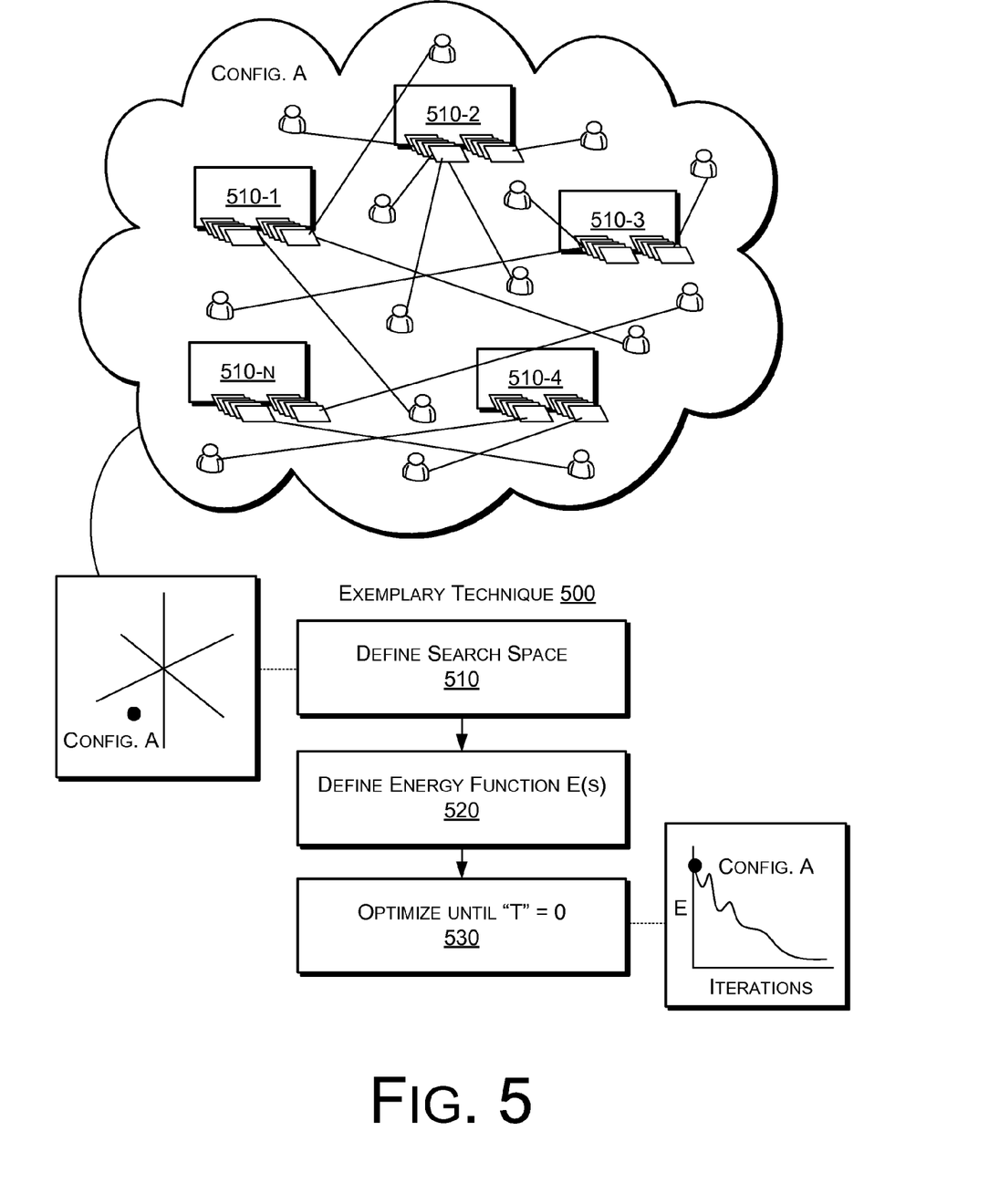
FIG. 5 is a block diagram of an exemplary optimization technique for deciding whether to migrate resources between data centers.

FIG. 5 shows an exemplary analysis technique 500 to optimize one or more data center configurations. A cloud shows Configuration A for data centers 510-1, 510-2, . . . , 510-n that include migratable resources for various users. As mentioned, migratable resources may be data, objects, code, etc., that can be migrated from one data center to another data center. Configuration A is a "high energy" configuration as geographically distributed users are not proximate to resources they request in the geographically distributed data center. Configuration A can be optimized in various fashions. For example, where the users in Configuration A make requests to a geo-hosted service (i.e., hosted at multiple, geographically disparate data centers), then it is possible to migrate resources, associated with each user and the service, to geographically proximate data centers and thereby achieve a lower energy configuration.

In the example of FIG. 5, the exemplary technique 500 relies on aspects of simulated annealing (SA). Annealing is a physical process often applied to metals that "reconfigures" molecules (e.g., bonds, phases, position) to induce ductility, relieve internal stresses, refine the structure and improve cold working properties. By analogy to this physical process, each iteration of an SA algorithm replaces a current configuration with a random "nearby" configuration, chosen with a probability that depends on the difference between corresponding function values and on a global parameter "T" (called the temperature), that is gradually decreased during the process. The dependency is such that the current configuration changes almost randomly when T is large, but increasingly "downhill" (i.e., to lower energy configurations) as T goes to zero. The allowance for "uphill" moves (i.e., to higher energy configurations) helps to avoid local minima.

An optimization technique may include aspects analogous to Brownian motion, where the mean kinetic energy is proportional to a controlled or scheduled "temperature" parameter. In a Brownian motion technique, "medium viscosity" and "particle size" can be accounted for analogously. For example, medium viscosity may be modeled by network bandwidth surrounding a data center where a data center in a heavily networked high traffic region has a higher viscosity, which requires a higher "resource" kinetic energy for a resource to migrate to or away from that data center. Further, a viscosity may be less for moving to a data center and higher for moving away from a data center or vice versa. With respect to particle size, factors such as size of a file, object, folder, etc., may be used to determine a particle size parameter. As described herein, viscosity and size parameters may be analogous to the Brownian motion parameter for particle mobility (B), which is inversely proportion to a medium's viscosity and the size of a particle (i.e., higher viscosity and larger size make a particle less mobile). Other analogies may be drawn to diffusion, where an analysis module accounts for resource "concentration" and diffusion coefficients, which may differ for types of resources, data centers, geography, etc. The foregoing techniques are all temperature dependent and allow for occasional "bad" migrations (migrations that are not locally optimal) to avoid local minima. As described herein, an exemplary approach, whether temperature dependent or not, may allow for sub-optimal migration decisions to avoid local minima states that, in turn, facilitate migration towards an optimal, global minimum state.

Referring again to the exemplary technique 500 of FIG. 5, a definition block 510 defines a search space while another definition block 520 defines an energy function (E). In a temperature type of approach, an optimization block 530 performs an optimization by varying state and determining energy until the temperature T reaches some value (e.g., T=0). While this example mentions T going to zero and hence infers an end to the optimization, in practice, the process may be repeated and the temperature cycled (e.g., periodically or continuously). In other words, optimization may occur on-demand, in response to some event, periodically, continuously, etc. In addition, a system (i.e., "cloud") may be expected to have natural perturbations due to changes in services, new users, etc. Hence, an optimal state is likely to remain optimal for only some period of time.

Figure 6:
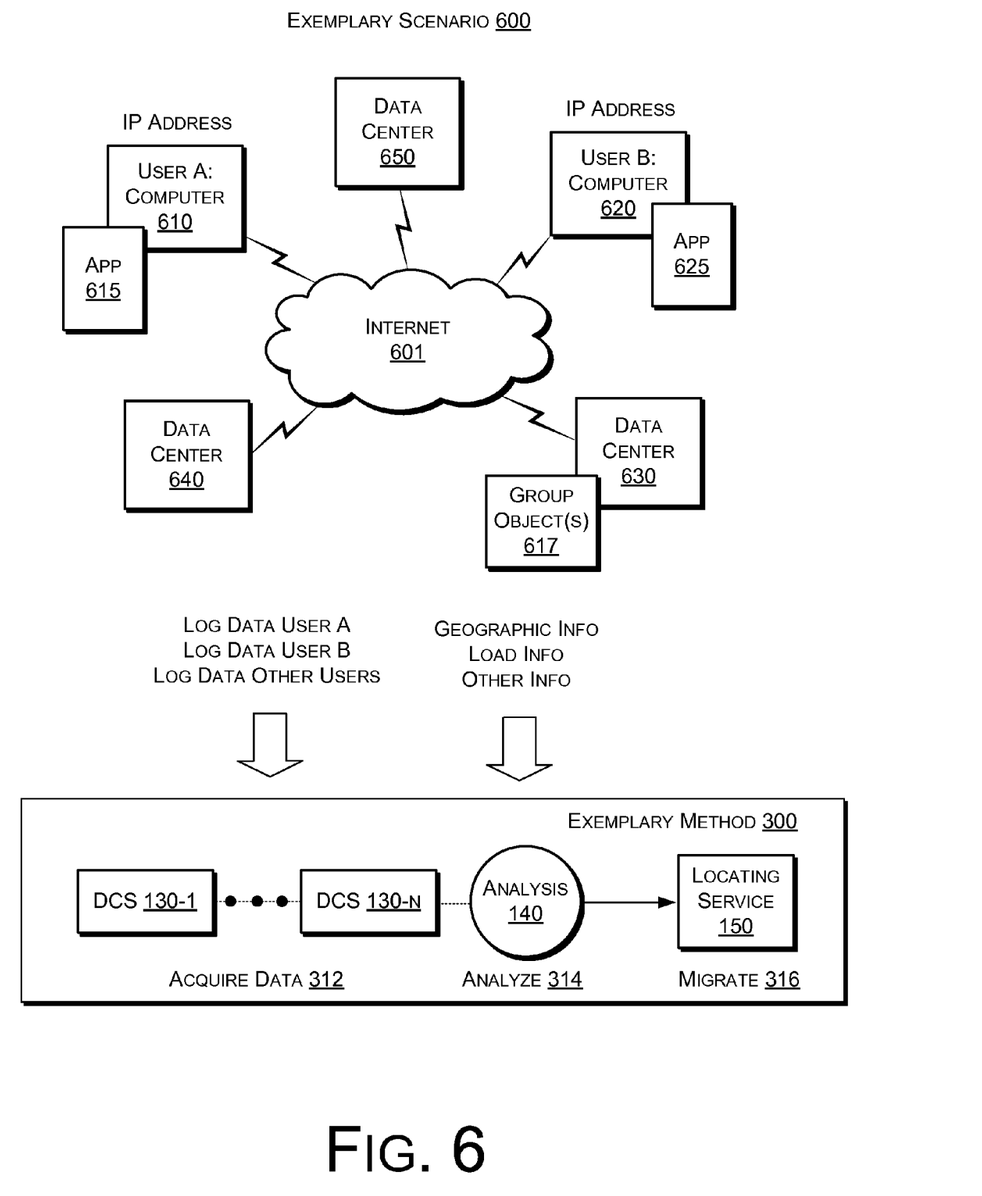
FIG. 6 is a block diagram of an exemplary scenario where a decision may be made to migrate a group resource from one data center to another.

FIG. 6 shows an exemplary scenario 600 where users A and B make requests that rely on a group object or objects 617 stored in a data center 630. In the example of FIG. 6, user A makes requests for the group object(s) 617 via a computer 610 executing an application 615 and user B makes requests for the group object(s) 617 via a computer executing an application 625. In this example, data centers 640 and 650 are available for hosting the group object(s) 617. As described herein, a group object may be a family mailbox (one that is shared among all members of a family), a group mailbox, a video or photo (e.g., a YOUTUBE video), etc. As described herein, a resource such as a mailbox can be considered communication information for one or more users. With respect to a resource, communication information typically includes one or more of text, photos, audio, or video that can be sent, received, posted or accessed via a network (e.g., via email applications, instant messaging applications, social networking websites, etc.).

As indicated by the exemplary method 300, in an acquisition phase 312, the DCS components 130-1 to 130-*n* acquire data such as the log data of users A and B and optionally data such as log data of other users (which may also make requests for the group object(s) 617). In an analysis phase 314, an analysis module 140 (e.g., operating in a distributed manner in conjunction with the DCS components) analyzes the acquired data, optionally with other information such as geographic information about data centers, load information about data centers and/or network infrastructure, etc. The analysis phase 314 makes one or more decisions that may be then directed to a locating service 150 in a migration phase 316. As mentioned, a locating service may inform various data centers of locations and may also request and perform migrations between data centers.

Figure 7:
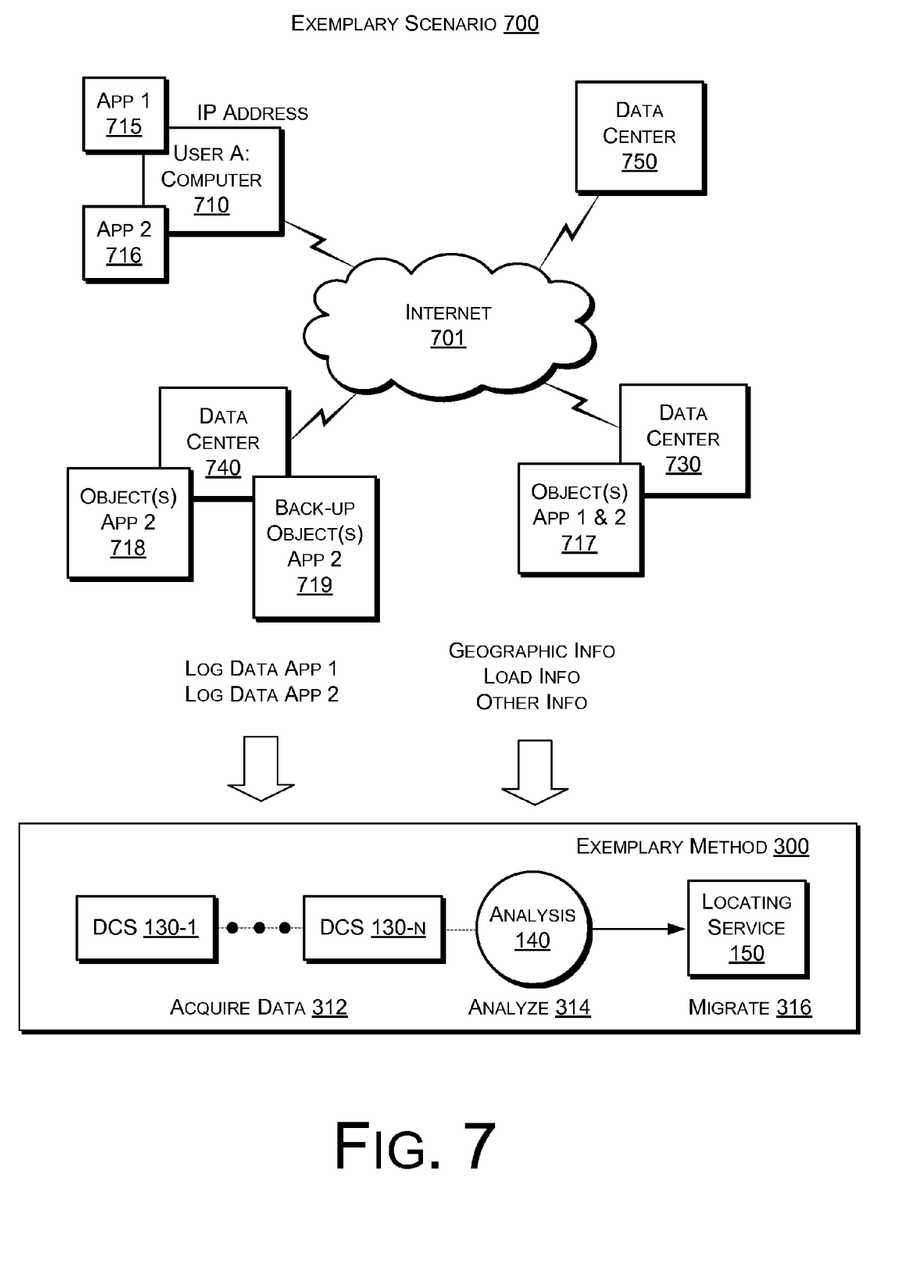
FIG. 7 is a block diagram of an exemplary scenario where a decision may be made to migrate a resource used by multiple applications from one data center to another data center.

FIG. 7 shows an exemplary scenario 700 where user A makes requests associated with an application 715 (App 1) and another application 716 (App 2) that rely on an object or objects 717 stored in a data center 730; noting that application 716 (App 2) also relies on an object or objects 718 stored in a different data center 740. In addition, the data center 740 stores a back-up copy or copies (e.g., a replica or replicas) 719 of the object(s) 718.

As indicated by the exemplary method 300, in an acquisition phase 312, the DCS components 130-1 to 130-*n* acquire data such as the log data of user A associated with the application 715 (App 1) and the application 716 (App 2). In an analysis phase 314, an analysis module 140 (e.g., operating in a distributed manner in conjunction with the DCS components) analyzes the acquired data, optionally with other information such as geographic information about data centers, load information about data centers and/or network infrastructure, etc. The analysis phase 314 makes one or more decisions that may be then directed to a locating service 150 in a migration phase 316. As mentioned, a locating service may inform various data centers of locations of data objects and may also request and perform migrations of data objects between data centers.

As described herein, an exemplary method (e.g., implemented at least in part by a computing device) can include acquiring log information from a front-end component of a data center and from one or more servers in the data center where the log information includes information associated with a request for a resource in the data center (e.g., a request ID, etc.); analyzing the log information with respect to a model to determine whether the resource in the data center should be migrated to a data center in a different geographical location; and, if the analyzing decides that the resource should be migrated, then calling for migration of the resource to the data center in the different geographical location. Such a method may further include migrating the resource to the data center in the different geographical location. Such a method may be implemented, at least in part, in the form of one or more computer-readable media that include computer-executable instructions to perform various functions.

As mentioned, a model may allow for migration decisions that help to avoid local minima configurations (see, e.g., simulated annealing and temperature). In the aforementioned exemplary method, the log information can include an IP address associated with an issuer of the request, a time associated with issuance of the request or receipt of the request by the data center and/or a time associated with issuance of the request and a time associated with receipt of the request by the data center. As mentioned, log information may include log information for multiple requests for a group resource (a resource accessed by multiple users or clients) in a data center, the multiple requests issued by multiple issuers. Additionally or alternatively, log information may include log information for multiple requests for a resource in a data center, the multiple requests associated with a common IP address. Log information may include any of a variety of other information that may allow for identification of a user, locating a user or otherwise associating a user with one or more resources. For example, log information may be application-specific information (e.g., user ID, user profile, geographic location, email address, etc.).

With respect to resources, a resource may be an email application mailbox associated with an issuer of a request, a file associated with an issuer of a request, a group resource, etc. In various examples, a resource may be a persistent state such as a hard state or a soft state stored in memory. As mentioned, in general, a resource can be migrated from one data center to another via a network.

Figure 8:
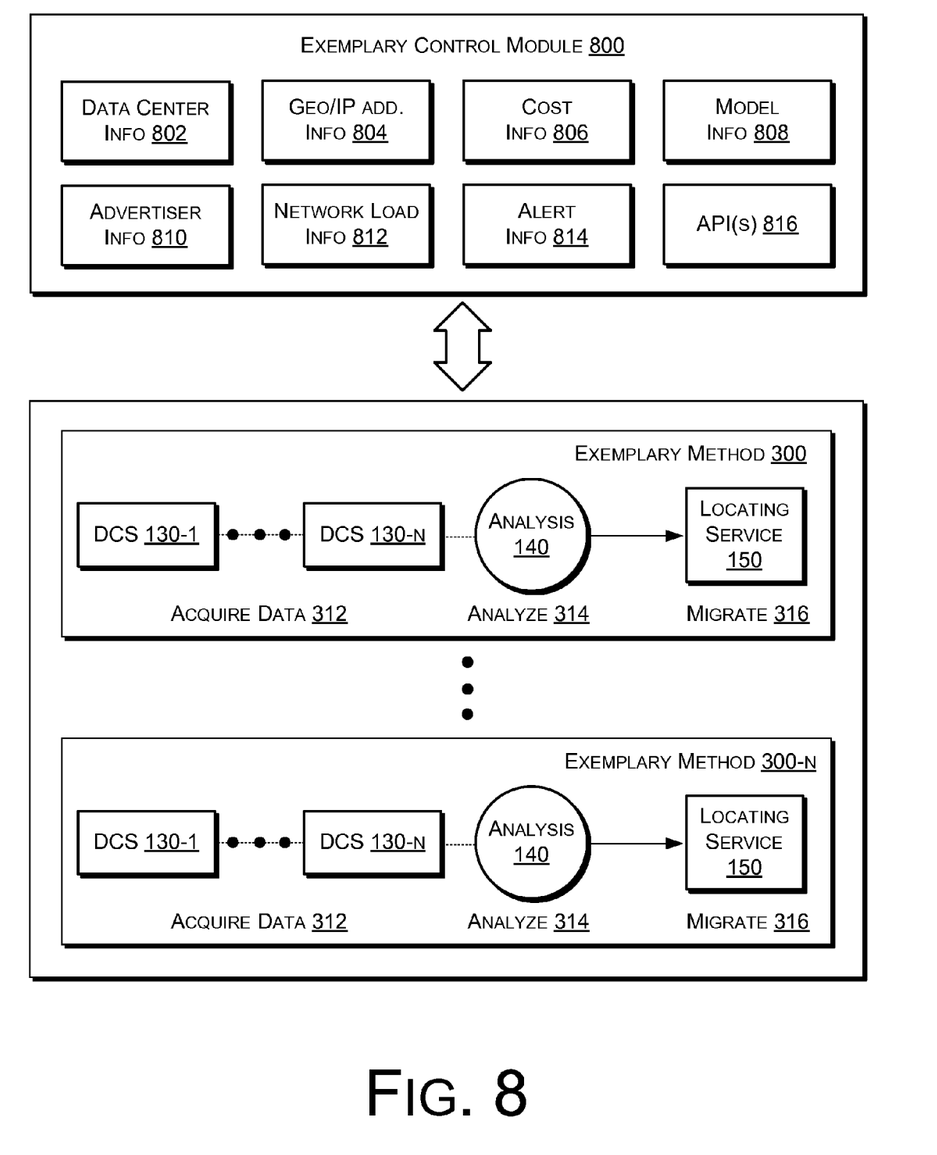
FIG. 8 is a block diagram of an exemplary control module or controller to control components configured to make migration decisions.

FIG. 8 shows an exemplary control module 800 for controlling one or more method 300 to 300-*n*, which can make migration decisions for resources in a system (e.g., "cloud") with multiple, geographically disparate data centers. As shown, the module 800 include a data center information module 802, a geographic/IP address information module 804, a cost information module 806, a model information module 808 (e.g., pertaining to an optimization model), an advertiser information module 810, a network load information module 812, an alert module 814 and one or more application programming interfaces 816.

The data center information module 802 may acquire information about data center operation such as the types of services hosted, the computing power, the storage capacity, the bandwidth, cost of operation, etc. The geography/IP address module 804 may include a table to associate IP addresses with geographical locations and network routes between locations (e.g., an Internet map, etc.). The cost information module 806 may account for costs at data centers and costs associated with migration of one or more resources from one data center to another data center. The model information module 808 may allow for model updates and changes to parameters such as the aforementioned, temperature, state space, viscosity, etc., parameters. The advertiser information module 810 may track advertising revenue, placement of advertisements, and other ad-related information, especially where a migration decision may affect (positively or negatively) advertising opportunities. For example, certain migration decisions may lower cost for distribution of advertisements to users. The network load information module 812 may be coupled to a global traffic monitor to thereby account for traffic patterns, especially with respect to time and geography. The alert module 814 may be configured to receive alerts from emergency services (e.g., earthquakes, power outages, network malfunctions, etc.) and thereby affect how migration decisions are performed. For example, an alert may cause a shut-down of an analysis and implementation of an emergency plan. In such a manner, a model may be buffered from emergency actions, which could otherwise taint a model (e.g., affect its parameters). The API(s) 816 may allow data centers operators to make calls to the control module 800. Such calls may act to update data center information 802 and/or to change one or more model parameters. For example, if a particular data center is experiencing congestion, then it may make an API call to the control module to change its viscosity parameter (e.g., a change to make it easier to migrate resources away from the data center or to cause a halt to all migrations for that data center, which ever may be suitable given the congestion). Further, if a data center is performing an upgrade to a service (or has scheduled an upgrade), then the data center may inform the control module 800 using an API call via the API(s) module 816.

As described herein, an exemplary controller includes a data center information module for acquiring information from geographically disparate data centers that host resources for a common service; a geographical and IP address information module for associating IP addresses for service requests to geographical locations; and a model information module for maintaining a model to make decisions as to whether one or more of the hosted resources for the common service should be migrated, via the Internet, from one of the geographically disparate data centers to another based at least in part on geographical locations of service requests for the one or more of the hosted resources.

Figure 9:
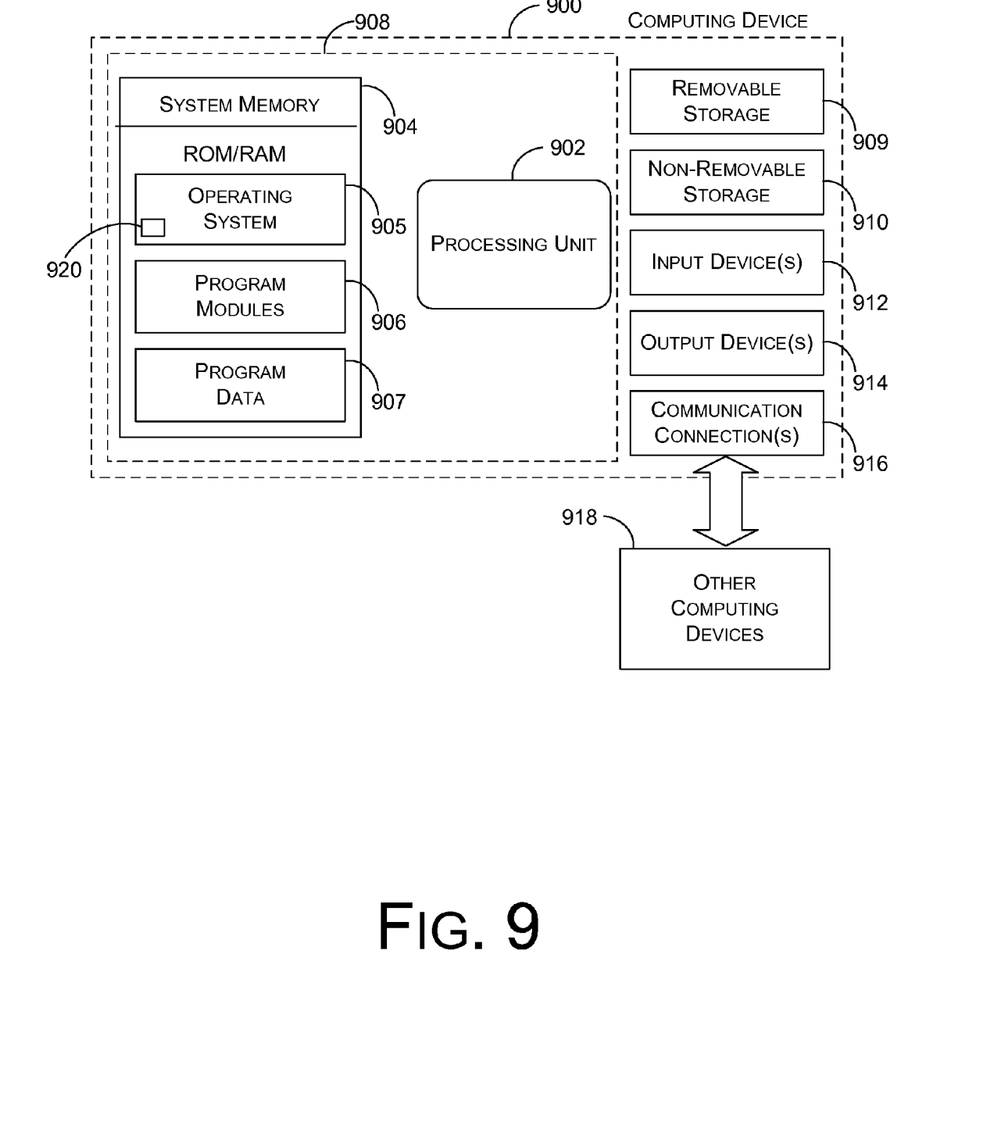
FIG. 9 is a block diagram of an exemplary computing device.

FIG. 9 illustrates an exemplary computing device 900 that may be used to implement various exemplary components and in forming an exemplary system. For example, computing devices of the data center 100 of FIG. 1 may include various features of the device 900.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. The operating system 905 include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 900 is of a very basic configuration demarcated by a dashed line 908. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well known in the art and need not be discussed at length here.

Computing device 900 may also contain communication connections 916 that allow the device to communicate with other computing devices 918, such as over a network. Communication connections 916 are one example of communication media. Communication media may typically be embodied by computer readable instructions, data structures, program modules, etc. Communication may occur via wire (e.g., a wired network, a direct-wired connection, etc.) or wirelessly (e.g., acoustic, RF, infrared and other wireless transmission).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more processors;
one or more memories coupled to the one or more processors;
a front-end component stored in the one or more memories and executable by the one or more processors to receive a request for resources in a first data center, associate the request with identifying information, break the request into two or more sub-requests, send the two or more sub-requests separately, direct a particular resource for a respective sub-request, and store, in a log file, the identifying information of the request, identifying information of the respective sub-request, and the particular resource to which the respective sub-request is directed;
one or more distributed computation and storage components stored in the one or more memories and executable by the one or more processors to acquire log information and analyze the log information to decide if the particular resource associated with the respective sub-request should be migrated to a second data center in a different geographical location; and
a location service component stored in the one or more memories and executable by the one or more processors to receive a decision made by the one or more distributed computation and storage components and inform the front-end component that the decision causes the particular resource to be migrated to the second data center in the different geographical location to thereby allow the front-end component to re-direct future requests for the particular resource to the second data center in the different geographical location.

2. The system of claim 1, wherein the particular resource comprises a migratable resource capable of being migrated via a network from the first data center to the second data center.

3. The system of claim 1, wherein the log information comprises an IP address that geographically locates an issuer of the request.

4. The system of claim 1, wherein the log information comprises IP addresses that geographically locate issuers of requests for at least one common resource.

5. The system of claim 1, wherein the one or more distributed computation and storage components are further executable by the one or more processors to analyze the log information with respect to a model that generates migration decisions that reduce a likelihood of local minima configurations.

6. A method comprising:
under a control of a computing device configured with computer-readable instructions,
receiving a request for one or more data resources stored in a first data center, wherein the one or more data resources are accessed based at least in part on the request, and wherein the one or more data resources comprise migratable data resources capable of being migrated via a network from the first data center to a second data center geographically separate from the first data center;
determining if the one or more data resources associated with the request should be migrated to the second data center in a different geographical location based on a plurality of factors including a state of the one or more data resources that is shared across multiple entities external to the first data center and including a frequency of user requests of the one or more data resources;
analyzing log information with respect to a model that generates migration decisions that reduce a likelihood of local minima configurations;
identifying at least a most frequently used portion of the one or more data resources to be migrated to the second data center in the different geographical area based at least in part on the frequency of the user requests of the one or more data resources; and
migrating the at least the most frequently used portion of the one or more data resources to the second data center in the different geographical area based on the identifying.

7. The method of claim 6, wherein the log information comprises an IP address that geographically locates an issuer of the request.

8. The method of claim 6, wherein the log information comprises IP addresses that geographically locate issuers of requests for at least one common resource.

9. The method of claim 6, wherein the plurality of factors further include an available bandwidth between the first data center and one or more external devices.

10. The method of claim 6, wherein the plurality of factors further include a latency between a computing device of a user and the first data center.

11. The method of claim 6, wherein the migrating is based in part on at least one of a business factor or a legal constraint on a geographical location of the one or more resources.

12. The method of claim 6, wherein the analyzing the log information is based in part on an iteration of an application of a simulated annealing algorithm, each iteration of the application of the simulated annealing algorithm replacing a current configuration of the first data center with another configuration of the second data center chosen with a probability that depends on a difference between an energy function and a temperature parameter, the energy function indicating a geographical distance between the first data center and a user.

13. A system comprising:
one or more processors; and
memory storing instructions that, when executed by the one or more processors, configure the system to perform operations comprising:
receiving a request for a resource in a first data center at a first location;
associating the request with identifying information;
storing, in a log file, the identifying information and information about the first location of the resource;
analyzing log information in the log file to decide if the resource associated with the request should be migrated to a second data center at a second different geographical location, the analyzing comprising analyzing the log information based on an iteration of an application of a simulated annealing algorithm, each iteration of the application of the simulated annealing algorithm replacing a current configuration of the first data center with another configuration of the second data center chosen with a probability that depends on a difference between an energy function and a temperature parameter, the energy function indicating a geographical distance between the first data center and a user; and
based at least partly on a decision to cause the resource to be migrated to the second data center in the second different geographical location, re-directing a future request for the resource to the second data center in the second different geographical location.

14. The system of claim 13, wherein the resource comprises a migratable resource capable of being migrated via a network from the first data center to the second data center.

15. The system of claim 13, wherein the log information comprises an IP address that geographically locates an issuer of the request.

16. The system of claim 13, wherein the log information comprises IP addresses that geographically locate issuers of requests for at least one common resource.

17. The system of claim 13, wherein the analyzing comprises analyzing log information with respect to a model that generates migration decisions that reduce a likelihood of local minima.

18. The system of claim 13, wherein the current configuration of the first data center changes randomly to the another configuration of the second data center based at least partly on a determination that the temperature parameter is above a threshold.

19. The system of claim 13, wherein as the temperature parameter declines, the probability increases that the difference between the energy function and the temperature parameter in the current configuration of the first data center is greater than the difference in the another configuration of the second data center.

20. The system of claim 13, wherein the difference between the energy function and the temperature parameter in the current configuration of the data center increases in the another configuration of the second data center to reduce the likelihood of local minima.

\* \* \* \* \*